(12) United States Patent
Al-Bayati et al.

(10) Patent No.: US 12,246,868 B2
(45) Date of Patent: Mar. 11, 2025

(54) METHOD OF FORMING AN AUTOMATIC DISHWASHING POUCH, VACUUM FORMING SYSTEM AND POUCH

(71) Applicant: Reckitt Benckiser Finish B.V., Hoofddorp (NL)

(72) Inventors: Alias Younis Al-Bayati, Heidelberg (DE); Kai Werner Heppert, Heidelberg (DE); Krzysztof Paziewski, Heidelberg (DE); Torsten Roth, Heidelberg (DE); Claudia Schmaelzle, Heidelberg (DE); Christian Schneeweiss, Heidelberg (DE); Boris Seitz, Heidelberg (DE)

(73) Assignee: Reckitt Benckiser Finish B.V., Hoofddorp (NL)

( * ) Notice: Subject to any disclaimer, the term of this patent is extended or adjusted under 35 U.S.C. 154(b) by 731 days.

(21) Appl. No.: 17/422,823

(22) PCT Filed: Jan. 17, 2020

(86) PCT No.: PCT/EP2020/051111
§ 371 (c)(1),
(2) Date: Jul. 14, 2021

(87) PCT Pub. No.: WO2020/152044
PCT Pub. Date: Jul. 30, 2020

(65) Prior Publication Data
US 2022/0081656 A1    Mar. 17, 2022

(30) Foreign Application Priority Data

Jan. 22, 2019  (GB) .................................... 1900850
May 23, 2019  (GB) .................................... 1907264

(51) Int. Cl.
*B65B 11/50*    (2006.01)
*B29C 51/10*    (2006.01)
(Continued)

(52) U.S. Cl.
CPC .............. *B65B 11/50* (2013.01); *B29C 51/10* (2013.01); *B29C 51/18* (2013.01); *B29C 51/422* (2013.01);
(Continued)

(58) Field of Classification Search
CPC ....... B29C 51/10; B29C 51/18; B29C 51/422; B65B 47/02; B65B 47/10; B65B 3/022; B65B 11/50
See application file for complete search history.

(56) References Cited

U.S. PATENT DOCUMENTS 3,218,776 A   11/1965  Cloud
3,386,503 A    6/1968  Corning
(Continued)

FOREIGN PATENT DOCUMENTS

CN   207224567 U   4/2018
CN   108609237 A  10/2018
(Continued)

OTHER PUBLICATIONS

Combined Search and Examination Report for United Kingdom Patent Application No. 1900850.7 mailed Jul. 19, 2019.
(Continued)

*Primary Examiner* — Jamel M Nelson
(74) *Attorney, Agent, or Firm* — Dunlap Codding, P.C.

(57) ABSTRACT

A method of forming an automatic dishwashing pouch comprising the steps of: providing a sheet of material (10); identifying one or more regions of the material; heating the material with a heating device having a non-uniform heating profile, the non-uniform heating profile arranged to heat the identified region(s) to a greater temperature than other regions of the material; and forming the material in a mould to form the automatic dishwashing pouch, the automatic dishwashing pouch including a plurality of cavities (12).

20 Claims, 1 Drawing Sheet

Figure 1:
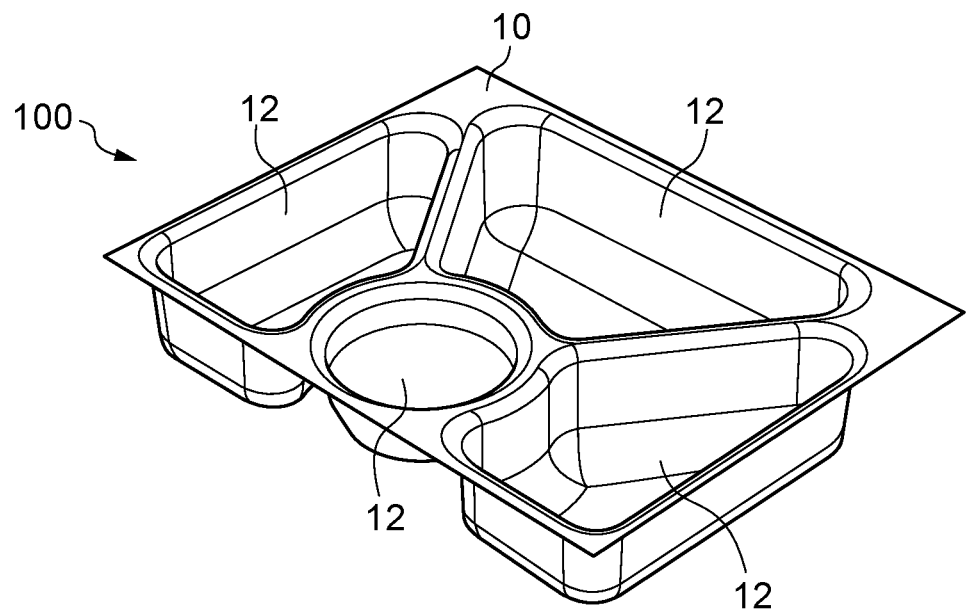

(51) Int. Cl.
    *B29C 51/18*      (2006.01)
    *B29C 51/42*      (2006.01)
    *B65B 3/02*       (2006.01)
    *B65B 47/02*      (2006.01)
    *B65B 47/10*      (2006.01)
    *C11D 3/37*       (2006.01)
    *C11D 17/04*      (2006.01)
    *B29K 29/00*      (2006.01)
    *B29L 31/00*      (2006.01)

(52) U.S. Cl.
    CPC ............ *B65B 3/022* (2013.01); *B65B 47/02* (2013.01); *B65B 47/10* (2013.01); *C11D 3/3753* (2013.01); *C11D 17/045* (2013.01); *B29K 2029/04* (2013.01); *B29K 2995/0062* (2013.01); *B29L 2031/7128* (2013.01); *B65B 2230/02* (2013.01); *C11D 2111/14* (2024.01)

(56) References Cited

U.S. PATENT DOCUMENTS

| | | |
|---|---|---|
| 2004/0014213 A1 | 7/2004 | Edwards et al. |
| 2007/0015757 A1 | 1/2007 | Madsen et al. |
| 2009/0004270 A1 | 2/2009 | Maslowski et al. |
| 2010/0010161 A1 | 4/2010 | Arriola et al. |
| 2011/0000613 A1 | 1/2011 | Cigallio et al. |
| 2011/0001015 A1 | 5/2011 | Bach et al. |
| 2011/0002906 A1 | 12/2011 | Shanley |
| 2012/0117922 A1* | 5/2012 | Meyer .................. B29C 51/422 493/267 |
| 2015/0098908 A1* | 4/2015 | Sharma ................ C07K 14/245 536/23.1 |
| 2016/0347521 A1* | 12/2016 | Fowler .................... B65B 61/02 |
| 2017/0029821 A1 | 10/2017 | Brody et al. |
| 2018/0186059 A1* | 7/2018 | Valkas .................. B29C 51/422 |

FOREIGN PATENT DOCUMENTS

| | | | |
|---|---|---|---|
| EP | 0055082 A2 | 6/1982 | |
| EP | 0188832 A2 | 7/1986 | |
| EP | 1375637 A1 | 1/2004 | |
| EP | 3025848 A1 | 6/2016 | |
| EP | 3112128 A1 | 1/2017 | |
| GB | 2475538 A * | 5/2011 | ............ B29C 51/10 |
| GB | 2520306 A | 5/2015 | |
| KR | 101865018 B1 | 6/2019 | |
| WO | 2008034624 A1 | 3/2008 | |

OTHER PUBLICATIONS

Search Report for United Kingdom Patent Application No. 1900850.7 mailed Nov. 25, 2019.

Office Action for Chinese Application No. 202080009990.9 mailed Jan. 5, 2023.

International Search Report and Written Opinion for PCT Application No. PCT/EP2020/051111 dated Apr. 24, 2020.

* cited by examiner

METHOD OF FORMING AN AUTOMATIC DISHWASHING POUCH, VACUUM FORMING SYSTEM AND POUCH

CROSS-REFERENCE TO RELATED APPLICATIONS

This application is a U.S. National Phase of International Patent Application No. PCT/EP2020/051111, filed on 22 Jan. 2020, which claims priority to United Kingdom Application Serial Nos. 1900850.7 filed 22 Jan. 2019 and 1907264.4 filed 23 May 2019. The entire contents of these applications are incorporated herein by reference in their entirety.

The present invention relates to an automatic dishwashing pouch, a method of forming an automatic dishwashing pouch, and a system configured to form an automatic dishwashing pouch.

Water-soluble automatic dishwashing pouches are generally well-known products. These pouches are typically formed of one or more cavities, each of which are filled with a dishwashing composition such as a detergent.

Such automatic dishwashing pouches can be formed by thermoforming a suitable water-soluble and deformable sheet, such as polyvinyl alcohol (PVOH). Thermoforming comprises heating such a sheet to a pliable forming temperature and, in combination with one or more moulds, forming the sheet into one or more cavities. Multiple cavities have the advantage of separating incompatible components and improving aesthetics of the final product.

However, each additional dividing wall (necessary to form a cavity) results in the depth to which the cavities can be drawn being reduced. Furthermore, the thickness of the cavity walls is reduced for each additional cavity. As a result, the total volume of the pouch is less than is required, and the thickness of the walls may be lower than the required margin for stability and product integrity. There is also finite footprint available for automatic dishwashing pouches to enable them to fit in commercially available automatic dishwashers.

There are therefore practical limits on the number of cavities an automatic dishwashing pouch can possess without reducing the available volume for detergent compositions; reducing the thickness of the walls; and/or increasing the footprint to an unacceptable level. Using present technology, an effective commercial limit for acceptable cavity depth (and hence product volume) and wall thickness is reached for a pouch having three cavities. Any pouch produced with four or more cavities would fail to have a sufficient depth and/or wall thickness.

There is therefore a need for an improved method of forming an automatic dishwashing pouch that addresses these problems.

A method of forming an automatic dishwashing pouch according to the present invention is provided according to claim 1.

This method results in a pouch having a multitude of cavities without sacrificing cavity depth or wall thickness as it is easier to stretch the areas which are heated to a greater extent.

The material may be formed in the mould such that the automatic dishwashing pouch comprises two or more cavities, preferably three or more, or most preferably four or more. This allows a larger quantity of dishwashing compositions to be retained by the pouch.

The identified regions may exceed a strain value limit of 1 on the Von Mises scale, preferably 1.5, 2.0, 2.4 or even 2.8. This allows the regions which undergo the greatest strain to be additionally heated for a stronger and more stable pouch.

The step of identifying the regions may comprise computer modelling the behaviour of the material and/or the final form of the pouch. This allows the necessary heating profile to be determined in advance for any shape of any automatic dishwashing pouch.

The identified region(s) of the material may correspond to walls and/or bases of the cavities. These are typically the regions which undergo the most significant deformation during the forming process.

The walls of the cavities may be heated to a greater temperature than the bases of the cavities. The walls in particular undergo the greatest amount of deformation and hence see the greatest benefits of the present invention.

The formed automatic dishwashing pouch may have a minimum thickness of no less than 30 μm, preferably no less than 25 μm. Such a minimum thickness ensures the stability and integrity of the automatic dishwashing pouch. In an embodiment, the thickness of the chambers vary depending on whether they are containing gels or powders. The chambers containing powders may have a minimum thickness of from 10 to 30 μm, preferable from 15 to 25 μm. The chambers containing gels may have a minimum thickness of from 15 to 35 μm, preferably from 20 to 30 μm.

The cavities may define a cumulative volume of at least 11 mL, preferably at least 12 mL, more preferably at least 13 mL, most preferably at least 15 mL. This allows a suitable dosage of dishwashing composition to be provided by the pouch.

The material may be water soluble polymer, for example polyvinyl alcohol film. Other possible water soluble materials are poly(lactic acid) films, and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, most preferably polyvinyl alcohols, polyvinyl alcohol copolymers and hydroxypropyl methyl cellulose. These are suitable materials for both the forming steps and end use.

The automatic dishwashing pouch may have a footprint of less than or equal to 60 mm by 50 mm, preferably from 52 to 58 mm by 42 to 48 mm, such as 55 mm by 45 mm. Pouches with these footprints are suitable for automatic dishwashing machines.

The term 'thermoforming' is hereby taken to include 'vacuum forming', where the sheet is drawn into the mould via vacuum. The forming step may comprise vacuum forming. Vacuum forming is a particularly suitable method for forming the automatic dishwashing pouches. Alternatively or additionally, the sheet may be forced into the mould with one or more jets of air as part of the forming step.

The method may further include the step of dosing one or more dishwashing composition(s) into one or more of the cavities. The insertion of the dishwashing composition is the subsequent step in the manufacture of the automatic dishwashing pouch.

The system may further comprise one or more dosing means for inserting an automatic dishwashing composition into one or more of the cavities. Suitable ingredients for inclusion in the automatic dishwashing composition are described below.

Use of non-uniform heating profile and heating material in a mould to form automatic dishwashing pouches in a plurality of cavities is provided according to claim 14. Such a use arrives at an automatic dishwashing pouch having the advantages discussed above.

A vacuum moulding system configured to form an automatic dishwashing pouch according to the present invention provided according to claim 15 or 16. This system results in an automatic dishwashing pouch having the advantages discussed above.

An automatic dishwashing pouch prepared by the described process comprising at least two cavities is provided. This automatic dishwashing pouch has the advantages as discussed above. Such an automatic dishwashing pouch could not be produced by previously known methods. Preferably the pouch has at least three cavities or even at least four cavities.

Figure 2:
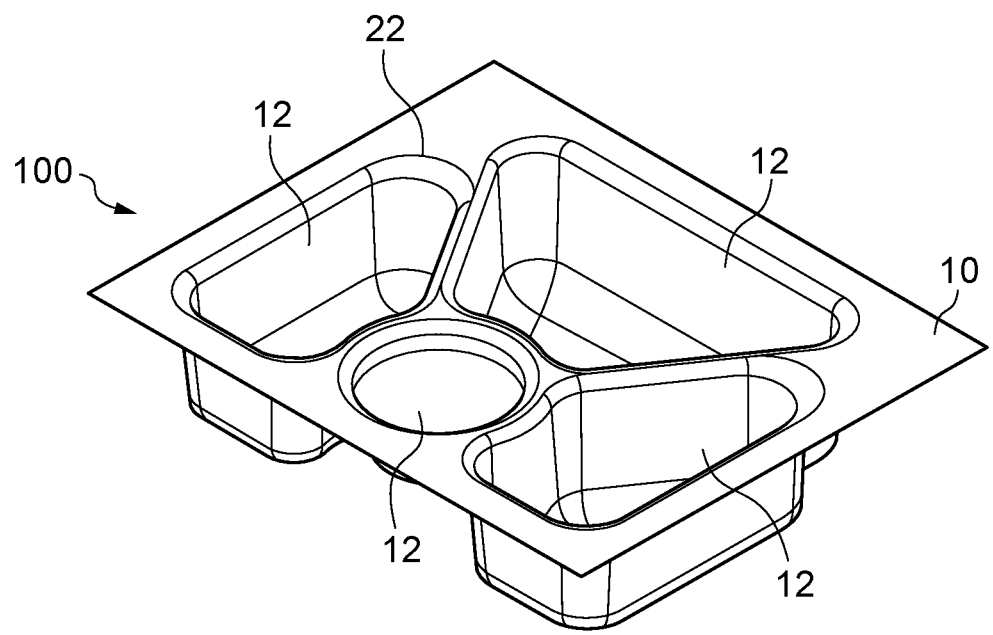

The present invention will now be described, by way of reference only, to the accompanying figures in which:

FIG. 1 shows an automatic dishwashing pouch produced according to prior art technologies; and FIG. 2 shows an automatic dishwashing pouch manufactured according to the present invention.

An automatic dishwashing pouch 100 is typically manufactured via a moulding process. A sheet of material is provided and the material is heated to a given temperature. The heated material is then moulded into the desired shape of the final automatic dishwashing pouch article. The material is typically polyvinyl alcohol (PVOH) but may alternatively be any water-soluble material that is suitable for thermoforming. An automatic dishwashing pouch 100 having four cavities 12 is shown in FIG. 1. These four cavities 12 are defined in the sheet of the material 10 and each have a cavity depth and cavity wall thickness. As the automatic dishwashing pouch has four cavities 12, the available material in the sheet 10 must stretch further than if there were fewer cavities 12. As a result, there is a limit on the depth of each cavity and the wall thickness of each cavity 12 may also be reduced.

The present inventors have discovered that this method may be improved by heating the sheet of material 10 with a heating device which has a non-uniform heating profile. That is, in contrast to typical heating devices which generate a constant heat across a work area (and often from a single heating element), a non-uniform heating profile means that different regions of the work area are provided with different temperatures. According to the present invention, specific regions of a work area (defined by the heating device) which align with the regions of the sheet of material 10 which must deform the greatest amount during the forming process, are heated to a higher temperature and/or for a longer time, than other regions in the sheet of material 10 which will not undergo as much deformation. As a result of this additional heating to the regions of most deformation the depth of each cavity 12 may be increased and the wall thickness of each cavity 12 is likewise maintained. A further advantage may be found in increasing the radius at the corners of cavities 12. For example, the corner 22 indicated on FIG. 2 may be formed with an increased radius compared to the same corner in FIG. 1. In particular, the radius may be at least 3 mm.

Without wanting to be bound by theory, as not all film areas are stretched evenly to be able to draw deeper without sacrificing thickness one needs to be able to "borrow" material from areas of lower stretch. The non-uniform heating profile results in the necessary movement of film. In particular, lower material flow during forming can be achieved in certain regions and hence greater wall thickness can be selectively achieved.

While the identification of the regions of greatest deformation can be carried out retrospectively and involve trial and error, it is preferred that the regions may be identified in advance using a computer modelling system. In this sense, the operator is able to simulate an automatic dishwashing pouch shape and arrangement and the computer modelling software is able to predict the regions which will deform to a greatest extent and hence design a non-uniform heating profile which is optimised for the desired arrangement of cavities.

It has been observed, as shown in Table 1 below, that by forming an automatic dishwashing pouch 100 according to this improved method a design with four cavities can be produced in which each cavity has a volume of at least 11 ml, preferably at least 12 ml, more preferably at least 13 ml and a minimum wall thickness of no less than 25 micrometres, preferably no less than 30 micrometres.

TABLE 1

Automatic Dishwashing Pouch Comparison

| | Cavity wall thickness/µm | | | | |
|---|---|---|---|---|---|
| | Cavity 1 | Cavity 2 | Cavity 3 | Cavity 4 | Total pouch volume/mL |
| Conventional heating | 14 | 16 | 15 | 64 | 13.47 |
| Non-uniform heating | 45 | 32 | 34 | 26 | 17.34 |

As can be seen from this data, the non-uniform heating profile produces a pouch with suitable wall thickness and an increased volume compared to the conventional (uniform) heating method. This therefore allows for the first time an automatic dishwashing pouch to be formed with four cavities, with a suitable volume and wall thickness.

In an embodiment, a system suitable for producing such an automatic dishwashing pouch 100 comprises a work area for receiving a sheet of material to be formed. A mould is also provided for forming this sheet into the automatic dishwashing pouch 100 with a plurality of cavities 12. Finally, a heating element is provided and arranged to provide a non-uniform heating profile to the work area.

In a particular embodiment, the system is in the form of an assembly line. A heating device is arranged adjacent to a thermoforming station and is configured to receive the sheet of material to be formed. The heating device comprises two contact heating devices that can be brought into contact simultaneously with the sheet of material from opposing sides. The contact heating devices define the work area. Each contact heating device comprises a heating circuit formed of a ceramic heating layer on a thermally-insulating support. The heating circuits are formed on the face of the support in such a way that they emit a locally different heating power over this face—that is a non-uniform heat profile across a two-dimensional plane.

This heated layer of material is then passed into the thermoforming station. A vacuum is generated in the cavity of the mould arranged beneath the layer of material via a vacuum pump. As a result, the heated layer of material is sucked against an inner wall of the mould. An overpressure may be simultaneously applied above the layer of material, for example via a compressed air supply, in order to assist with the forming process. After this process the product is cooled in this mould whilst maintaining the suction effect and (if required) the overpressure. This allows cooling to be carried out with the in-mould constraint. After cooling the automatic dishwashing pouch 100 can be removed from the mould.

In an alternative embodiment, the system comprises a rotary element, such as a cylindrical roller, configured to receive a sheet of material to be formed and is arranged adjacent to a thermoforming station. The rotary element comprises the heating element arranged to provide a non-uniform heating profile to the sheet of material as the sheet is being transported to the thermoforming station. In this way the rotary element acts simultaneously provides the work area and dispenses the sheet of material. The heated sheet is then passed into the thermoforming station. A vacuum is generated in the cavity of the mould arranged beneath the layer of material via a vacuum pump. As a result, the heated layer of material is sucked against an inner wall of the mould. An overpressure may be simultaneously applied above the layer of material, for example via a compressed air supply, in order to assist with the forming process. After this process the product is cooled in this mould whilst maintaining the suction effect and (if required) the overpressure. This allows cooling to be carried out with the in-mould constraint. After cooling the automatic dishwashing pouch 100 can be removed from the mould.

This embodiment has the advantages of reducing the space required for the assembly line, as separate work area to heat the sheet of material is not required between the sheet and the thermoforming station. As such a system also removes the space required for the work area to travel with the sheet of material as it is dispensed before returning to the starting position, the quantity of space saved is significant. The total quantity and complexity of moving machine parts in the system is also reduced.

The ceramic heating circuit may be applied to a ceramic support. The heating circuit may generate the non-uniform heat profile as a result of the distribution over the heating elements. Any desired temperature distribution can be achieved at any time by a suitable layout of the heating lines of the heating circuit on the support.

After the forming step, one or more automatic dishwashing compositions may be introduced into the cavities 12 of the automatic dishwashing pouch 100 to produce the final consumer article.

Automatic Dishwashing Composition

Preferably, the or each automatic dishwashing composition comprises one or more active ingredients selected from the group consisting of builders, bleaching agents, bleach activators, bleach catalysts, surfactants, enzymes, anti-corrosion agents, polymers and foam control agents.

Builders

The or each automatic dishwashing composition may include one or more builders (or co-builders). The builder/co-builder may be either a phosphorous-containing builder or a phosphorous-free builder as desired. In many jurisdictions, phosphate builders are banned. Preferably, therefore, the automatic dishwashing composition is phosphate-free.

If a phosphorous-free builder is included, it preferably comprises an aminocarboxylate or a citrate. Most preferably, the builder is selected from the group consisting of methylglycine diacetic acid (MGDA), N,N-dicarboxymethyl glutamic acid (GLDA), citrate and combinations of two or more thereof, such as a combination of MGDA and citrate. It is to be appreciated that the terms MGDA, GLDA and citrate encompass the free acids as well as salts, esters and derivatives thereof. Preferably, the citrate is trisodium citrate.

Other phosphorous-free builders include succinate based compounds. The terms "succinate based compound" and "succinic acid based compound" are used interchangeably herein.

Particular suitable builders include; for example, aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl) aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), a-alanine-N,N-diacetic acid (a-ALDA), β-alanine-N,N-diacetic acid (β-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N, N-diacetic acid (TUDA) and sulfomethyl-N,N-diacetic acid (SM DA) and alkali metal salts or ammonium salts thereof.

Preferred examples include tetrasodium imminosuccinate. Iminodisuccinic acid (IDS) and (hydroxy)iminodisuccinic acid (HIDS) and alkali metal salts or ammonium salts thereof are especially preferred succinate based builder salts. The phosphorous-free co-builder may also or alternatively comprise non-polymeric organic molecules with carboxylic group(s). Builder compounds which are organic molecules containing carboxylic groups include citric acid, fumaric acid, tartaric acid, maleic acid, lactic acid and salts thereof. In particular the alkali or alkaline earth metal salts of these organic compounds may be used, and especially the sodium salts. An especially preferred phosphorous-free builder is sodium citrate. Such polycarboxylates which comprise two carboxyl groups include, for example, water-soluble salts of, malonic acid, (ethylenedioxy)diacetic acid, maleic acid, diglycolic acid, tartaric acid, tartronic acid and fumaric acid. Such polycarboxylates which contain three carboxyl groups include, for example, water-soluble citrate. Correspondingly, a suitable hydroxycarboxylic acid is, for example, citric acid.

Preferred secondary builders include homopolymers and copolymers of polycarboxylic acids and their partially or completely neutralized salts, monomeric polycarboxylic acids and hydroxycarboxylic acids and their salts, phosphates and phosphonates, and mixtures of such substances. Preferred salts of the abovementioned compounds are the ammonium and/or alkali metal salts, i.e. the lithium, sodium, and potassium salts, and particularly preferred salts is the sodium salts. Secondary builders which are organic are preferred. A polymeric polycarboxylic acid is the homopolymer of acrylic acid. Other suitable secondary builders are disclosed in WO 95/01416, to the contents of which express reference is hereby made. Most preferably, the secondary builder is trisodium citrate.

Advantageously, 1-hydroxyethane 1,1-diphosphonic acid (HEDP) and related phosphonates may be used as threshold inhibitors and anti-scaling agents to prevent limescale formation.

Bleaching Agents, Bleach Activators and Bleach Catalysts

The bleaching agent, where present, is preferably selected from the group consisting of an oxygen-releasing bleaching agent, a chlorine-releasing bleaching agent and mixtures of two or more thereof. More preferably, the bleaching agent is or comprises an oxygen-releasing bleaching agent.

The bleaching agent may comprise the active bleach species itself or a precursor to that species. Preferably, the bleaching agent is selected from the group consisting of an inorganic peroxide, an organic peracid (such as peracetic acid), hydroperoxides and mixtures of two or more thereof. The terms "inorganic peroxide" and "organic peracid" encompass salts and derivatives thereof. Inorganic peroxides include percarbonates, perborates, persulphates, hydrogen peroxide and derivatives and salts thereof. The sodium and potassium salts of these inorganic peroxides are suitable, especially the sodium salts. Sodium percarbonate and sodium perborate are most preferred, especially sodium percarbonate.

The or each automatic dishwashing composition may further comprise one or more bleach activators and/or bleach catalysts. Any suitable bleach activator may be included, for example TAED, NOBS and/or DOBS, if this is desired for the activation of the bleaching agent. Any suitable bleach catalyst may be used, but manganese-based compounds are particularly preferred, for example manganese acetate, manganese oxalate, manganese TACN and/or dinuclear manganese complexes such as those described in EP 1741774 A1, the contents of which are incorporated herein by reference. Cobalt-based compounds may also be used, e.g. $[Co(NH_3)_5(OAc)]$. The organic peracids such as perbenzoic acid and peroxycarboxylic acids e.g. phthalimidoperoxyhexanoic acid (PAP) may be used without the use of a bleach activator or catalyst as these bleaches are active at relatively low temperatures such as about 30° C.

Surfactants

Surfactants may also be included in the automatic dishwashing product and any of nonionic, anionic, cationic, amphoteric or zwitterionic surface active agents or suitable mixtures thereof may be used. Many such suitable surfactants are described in Kirk Othmer's Encyclopedia of Chemical Technology, 3rd Ed., Vol. 22, pp. 360-379, "Surfactants and Detersive Systems", incorporated by reference herein. In general, bleach-stable surfactants are preferred according to the present invention.

In the case of automatic dishwashing products, it is preferred to minimise the amount of anionic surfactant. Preferably the product comprises no more than 2 wt %, no more than 1 wt %, or no, anionic surfactant. Preferably the product comprises no more than 5 wt %, no more than 1 wt %, or no, ionic surfactant of any type. Non-ionic surfactants are especially preferred instead for automatic dishwashing products.

A preferred class of non-ionic surfactants is alkoxylated non-ionic surfactants prepared by the reaction of a monohydroxy alkanol or alkylphenol with 6 to 20 carbon atoms. Preferably the surfactants have at least 12 moles, particularly preferred at least 16 moles, and still more preferred at least 20 moles, such as at least 25 moles, of alkylene oxide per mole of alcohol or alkylphenol. Particularly preferred non-ionic surfactants are the non-ionics from a linear chain fatty alcohol with 16-20 carbon atoms and at least 12 moles, particularly preferred at least 16 and still more preferred at least 20 moles, of alkylene oxide per mole of alcohol.

The non-ionic surfactants additionally may comprise propylene oxide units in the molecule. Preferably these PO units constitute up to 25 wt %, preferably up to 20 wt %, and still more preferably up to 15 wt % by weight of the overall molecular weight of the non-ionic surfactant.

Surfactants which are ethoxylated mono-hydroxy alkanols or alkylphenols, which may additionally comprises polyoxyethylene-polyoxypropylene block copolymer units may be used. The alcohol or alkylphenol portion of such surfactants constitutes more than 10 wt %, preferably more than 15 wt %, to less than 70, or 50 wt % by weight of the overall molecular weight of the non-ionic surfactant.

Another class of suitable non-ionic surfactants includes reverse block copolymers of polyoxyethylene and polyoxypropylene and block copolymers of polyoxyethylene and polyoxypropylene initiated with trimethylolpropane.

Another preferred class of nonionic surfactant can be described by the formula:

$$R_1O[CH_2CH(CH_3)O]_x[CH_2CH_2O]_y[CH_2CH(OH)R_2]$$

where $R_1$ represents a linear or branched chain aliphatic hydrocarbon group with 4-18 carbon atoms or mixtures thereof, $R_2$ represents a linear or branched chain aliphatic hydrocarbon rest with 2-26 carbon atoms or mixtures thereof, x is a value between 0.5 and 1.5, and y is a value of at least 15.

Another group of preferred non-ionic surfactants are the end-capped polyoxyalkylated non-ionics of formula:

$$R_1O[CH_2CH(R_3)O]_x[CH_2]_kCH(OH)[CH_2]_jOR_2$$

where $R_1$ and $R_2$ represent linear or branched chain, saturated or unsaturated, aliphatic or aromatic hydrocarbon groups with 1-30 carbon atoms, $R_3$ represents a hydrogen atom or a methyl, ethyl, n-propyl, iso-propyl, n-butyl, 2-butyl or 2-methyl-2-butyl group, x is a value between 1 and 30 and, k and j are values between 1 and 12, preferably between 1 and 5. When the value of x is >2 each $R_3$ in the formula above can be different. $R_1$ and $R_2$ are preferably linear or branched chain, saturated or unsaturated, aliphatic or aromatic hydrocarbon groups with 6-22 carbon atoms, where groups with 8 to 18 carbon atoms are particularly preferred. For the group $R_3$, H, methyl or ethyl is particularly preferred. Particularly preferred values for x are comprised between 1 and 20, preferably between 6 and 15.

As described above, in case x>2, each $R_3$ in the formula can be different. For instance, when x=3, the group $R_3$ could be chosen to build ethylene oxide ($R_3$=H) or propylene oxide ($R_3$=methyl) units which can be used in every single order for instance (PO)(EO)(EO), (EO)(PO)(EO), (EO)(EO)(PO), (EO)(EO)(EO), (PO)(EO)(PO), (PO)(PO)(EO) and (PO)(PO)(PO). The value 3 for x is only an example and bigger values can be chosen whereby a higher number of variations of (EO) or (PO) units would arise. Particularly preferred end-capped polyoxyalkylated alcohols of the above formula are those where k=1 and j=1 originating molecules of simplified formula:

$$R_1O[CH_2CH(R_3)O]_xCH_2CH(OH)CH_2OR_2$$

Another group of preferred non-ionic surfactants are mixed alkoxylate fatty alcohol nonionic surfactants The standard non-ionic surfactant structure is based on a fatty alcohol with a carbon C8 to C20 chain, wherein the fatty alcohol has been ethoxylated or propoxylated. The degree of ethoxylation is described by the number of ethylene oxide units (EO), and the degree of propoxylation is described by the number of propylene oxide units (PO). Such surfactants may also comprise butylene oxide units (BO) as a result of butoxylation of the fatty alcohol. Preferably, this will be a mix with PO and EO units. The surfactant chain can be terminated with a butyl (Bu) moiety.

Preferably the mixed alkoxylate fatty alcohol non-ionic surfactants comprise between 3 to 5 moles of the higher alkoxylate group and between 6 to 10 moles the higher lower group. Especially preferred are mixed alkoxylate fatty alcohol nonionic surfactants having 4 or 5 moles of the higher alkoxylate group and 7 or 8 moles of the lower alkoxylate group. According to one aspect of the invention a mixed alkoxylate fatty alcohol nonionic surfactant having 4 or 5 PO moles and 7 or 8 EO moles is especially preferred and good results have been obtained with for surfactants with 4 PO moles and 8 EO moles. It is especially preferred that the mixed alkoxylate fatty alcohol nonionic surfactant is C12-15 8EO/4PO (commercially available as Genapol EP 2584 ex Clariant, Germany).

The use of mixtures of different non-ionic surfactants is suitable in the context of the present invention, for instance mixtures of alkoxylated alcohols and hydroxy group containing alkoxylated alcohols.

Other suitable surfactants are disclosed in WO 95/01416, which is incorporated herein by reference.

Enzymes

Any type of enzyme conventionally used in detergent compositions may be used according to the present invention. It is preferred that the enzyme is selected from proteases, lipases, amylases, cellulases and peroxidases, with proteases and amylases being most preferred. It is most preferred that protease and/or amylase enzymes are included in the compositions according to the invention; such enzymes are especially effective for example in dishwashing detergent compositions. Any suitable species of these enzymes may be used as desired.

Anti-Corrosion Agents

Anti-corrosion agents may provide benefits against corrosion of glass and/or metal and the term encompasses agents that are intended to prevent or reduce the tarnishing of non-ferrous metals, in particular of silver and copper.

A preferred class of anti-corrosion elements are polyalkyleneimine, such a polyethyleneimines; which can be included in the quantities of from 0.001 to 5% by weight.

It is known to include a source of multivalent ions in detergent compositions, and in particular in automatic dishwashing compositions, for anti-corrosion benefits. For example, multivalent ions and especially zinc, bismuth and/or manganese ions have been included for their ability to inhibit such corrosion. Organic and inorganic redox-active substances which are known as suitable for use as silver/copper corrosion inhibitors are mentioned in WO 94/26860 and WO 94/26859. Suitable inorganic redox-active substances are, for example, metal salts and/or metal complexes chosen from the group consisting of zinc, manganese, titanium, zirconium, hafnium, vanadium, cobalt and cerium salts and/or complexes, the metals being in one of the oxidation states II, III, IV, V or VI. Particularly suitable metal salts and/or metal complexes are chosen from the group consisting of $MnSO_4$, Mn(II) citrate, Mn(II) stearate, Mn(II) acetylacetonate, Mn(II) [1-hydroxyethane-1,1-diphosphonate], $V_2O_5$, $V_2O_4$, $VO_2$, $TiOSO_4$, $K_2TiF_6$, $K_2ZrF_6$, $CoSO_4$, $Co(NO_3)_2$ and $Ce(NO_3)_3$. Any suitable source of multivalent ions may be used, with the source preferably being chosen from sulphates, carbonates, acetates, gluconates and metal-protein compounds. Zinc salts are specially preferred corrosion inhibitors.

Preferred silver/copper anti-corrosion agents are benzotriazole (BTA) or bis-benzotriazole and substituted derivatives thereof. Other suitable agents are organic and/or inorganic redox-active substances and paraffin oil. Benzotriazole derivatives are those compounds in which the available substitution sites on the aromatic ring are partially or completely substituted. Suitable substituents are linear or branch-chain $C_{1-20}$ alkyl groups and hydroxyl, thio, phenyl or halogen such as fluorine, chlorine, bromine and iodine. A preferred substituted benzotriazole is tolyltriazole (TTA).

Therefore, an especially preferred optional ingredient according to the present invention is a source of multi-valent ions such as those mentioned in the immediately preceding paragraphs and in particular compounds comprising zinc, bismuth and/or manganese ions and/or benzotriazole, including substituted benzotriazoles. In particular a source of zinc ions and unsubstituted benzotriazole are preferred as anti-corrosion agents and a mixture of these two ingredients is especially preferred according to the invention.

Polymers

Polymers intended to improve the cleaning performance of the automatic dishwashing product may also be included in the or each automatic dishwashing composition. For example sulphonated polymers may be used. Preferred examples include copolymers of $CH_2=CR^1CR^2R^3-O-C_4H_3R^4-SO_3X$ wherein $R^1$, $R^2$, $R^3$, $R^4$ are independently 1 to 6 carbon alkyl or hydrogen, and X is hydrogen or alkali with any suitable other monomer units including modified acrylic, fumaric, maleic, itaconic, aconitic, mesaconic, citraconic and methylenemalonic acid or their salts, maleic anhydride, acrylamide, alkylene, vinylmethyl ether, styrene and any mixtures thereof. Other suitable sulfonated monomers for incorporation in sulfonated (co)polymers are 2-acrylamido-2-methyl-1-propanesulphonic acid, 2-methacrylamido-2-methyl-1-propanesulphonic acid, 3-methacrylamido-2-hydroxy-propanesulphonic acid, allysulphonic acid, methallysulphonic acid, 2-hydroxy-3-(2 propenyloxy) propanesulphonic acid, 2-methyl-2-propenen-1-sulphonic acid, styrenesulphonic acid, vinylsulphonic acid, 3-sulphopropyl acrylate, 3-sulphopropylmethacrylate, sulphomethylacrylamide, sulphomethylmethacrylamide and water soluble salts thereof. Suitable sulphonated polymers are also described in U.S. Pat. No. 5,308,532 and in WO 2005/090541, which are incorporated herein by reference.

Particularly preferred are homopolymers of acrylic acid and/or copolymers of acrylic acid and maleic acid and/or copolymers of acrylic acid and sulfur-containing monomers.

Foam Control Agents

The or each automatic dishwashing composition may also comprise one or more foam control agents. Suitable foam control agents for this purpose are all those conventionally used in this field, such as, for example, silicones and their derivatives and paraffin oil.

The or each automatic dishwashing composition may also comprise minor, conventional, amounts of preservatives, fragrances, and the like.

The or each automatic dishwashing composition may be in the form of a powder, granules, a liquid, a gel or a paste. For example, where automatic dishwashing compositions are inserted into four cavities, one automatic dishwashing composition may be in the form of a powder or granules, with the remaining three automatic dishwashing compositions in the form of liquids, gels, pastes, or combinations thereof. In some embodiments, all four automatic dishwashing compositions may be in gel form. Where automatic dishwashing compositions are inserted into more than one cavity, each automatic dishwashing composition may be the same or different.

The invention is defined by the claims.

The invention claimed is:

1. A method of forming an automatic dishwashing pouch comprising the steps of:
   providing a sheet of material;
   identifying two or more regions of the sheet of material by computer modelling the behavior of the material, allowing a non-uniform heating profile to be determined;
   contacting the sheet of material with a heating device having a non-uniform heating profile to heat the sheet of material, the non-uniform heating profile arranged to heat the two or more identified regions to a greater temperature than other regions of the sheet of material; and forming the heated sheet of material in a mould to form the automatic dishwashing pouch, the automatic dishwashing pouch including a plurality of cavities, wherein each of the two or more heated identified regions corresponds to a base and walls of one of the cavities.

2. The method of claim 1, wherein the sheet of material is formed in the mould such that the automatic dishwashing pouch comprises three or more cavities.

3. The method of claim 1, wherein the two or more identified regions exceed a strain value limit of 2.0.

4. The method of claim 1, wherein the walls of the cavities are heated to a greater temperature than the bases of the cavities.

5. The method of claim 1, wherein the formed automatic dishwashing pouch has a minimum thickness of no less than 30 µm.

6. The method of claim 1, wherein the cavities define a cumulative volume of at least 11 mL.

7. The method of claim 1, wherein the sheet of material is polyvinyl alcohol.

8. The method of claim 1, wherein the sheet of material has a footprint of less than or equal to 60 mm by 50 mm.

9. The method of claim 1, wherein the forming step comprises vacuum forming.

10. The method of claim 1, further comprising the step of inserting at least one automatic dishwashing composition into one or more of the cavities.

11. The method of claim 1, wherein the cavities define a cumulative volume of at least 15 mL.

12. The method of claim 1, wherein the automatic dishwashing pouch comprises four or more cavities.

13. A method of forming an automatic dishwashing pouch comprising the steps of:
providing a sheet of material;
identifying at least four regions of the sheet of material by computer modelling the behavior of the material, allowing a non-uniform heating profile to be determined;
contacting the sheet of material with a heating device having a non-uniform heating profile to heat the sheet of material, the non-uniform heating profile arranged to heat the at least four identified regions to a greater temperature than other regions of the sheet of material;
forming the heated sheet of material in a mould to form the automatic dishwashing pouch that includes at least four cavities, wherein each of the at least four heated identified regions of the sheet of material corresponds to a base and walls of one of the cavities; and
inserting at least one automatic dishwashing composition into each of the at least four cavities.

14. The method of claim 13, wherein each of the at least one automatic dishwashing compositions inserted into each of the at least four cavities is selected from the group consisting of a powder, granules, a liquid, a gel, a paste, and combinations thereof.

15. The method of claim 13, wherein the at least four identified regions exceed a strain value limit of 2.0.

16. The method of claim 13, wherein the formed automatic dishwashing pouch has a minimum thickness of no less than 30 µm.

17. The method of claim 13, wherein the at least four cavities define a cumulative volume of at least 11 mL.

18. The method of claim 13, wherein the at least four cavities define a cumulative volume of at least 15 mL.

19. The method of claim 13, wherein the sheet of material is polyvinyl alcohol.

20. The method of claim 13, wherein the sheet of material has a footprint of less than or equal to 60 mm by 50 mm.

* * * * *